US006834872B2

(12) United States Patent
Chen

(10) Patent No.: US 6,834,872 B2
(45) Date of Patent: Dec. 28, 2004

(54) STRUCTURE OF SUPPORTIVE WALKER

(75) Inventor: Scott Chen, Taoyuan Hsien (TW)

(73) Assignee: Eurocare Innovation Co., Ltd., Taoyuan (TW)

( * ) Notice: Subject to any disclaimer, the term of this patent is extended or adjusted under 35 U.S.C. 154(b) by 0 days.

(21) Appl. No.: 10/750,774

(22) Filed: Jan. 5, 2004

(65) Prior Publication Data

US 2004/0239061 A1 Dec. 2, 2004

(51) Int. Cl.[7] .................................................. B62M 1/00
(52) U.S. Cl. ............................ 280/87.021; 280/87.041; 135/67; 135/65
(58) Field of Search ....................... 280/87.021, 87.041, 280/47.35, 47.27, 87.05, 642, 647, 648, 47.41, 641, 42; 135/65, 67

(56) References Cited

U.S. PATENT DOCUMENTS 5,348,336 A * 9/1994 Fernie et al. ............... 280/641
5,409,028 A * 4/1995 Lee ............................. 135/66
5,716,063 A * 2/1998 Doyle et al. ........... 280/87.041
5,772,234 A * 6/1998 Luo ........................... 280/642
5,816,593 A * 10/1998 Che ...................... 280/87.041
5,887,887 A * 3/1999 Keuning ..................... 280/641
6,311,708 B1 * 11/2001 Howle ......................... 135/67
6,318,392 B1 * 11/2001 Chen ........................... 135/67
6,494,469 B1 * 12/2002 Hara et al. ............. 280/87.041
6,688,633 B2 * 2/2004 van't Schip ................ 280/642

* cited by examiner

*Primary Examiner*—Hau Phan
(74) *Attorney, Agent, or Firm*—Bacon & Thomas PLLC

(57) ABSTRACT

A supportive walker includes a front frame, a rear frame, a pair of limitation plates, and at least one safety lock. The limitation plates are adapted to support relative movement of the front frame and the rear frame between an extended position and a folded position. The safety lock is adapted to selectively lock the front frame and the rear frame. The limitation plates are connected to the front frame and each has a passage defined therethrough to accommodate movement of the rear frame. The safety lock includes a mounting unit and a control unit such that the action of a spring force set outwardly pulls the control unit to move an inner protruding block along sliding slots at side wings of the mounting unit, and to further unlock the front frame and the rear frame so as to extend or fold the front frame and the rear frame.

6 Claims, 8 Drawing Sheets

STRUCTURE OF SUPPORTIVE WALKER

BACKGROUND OF THE INVENTION

1. Field of the Invention

The present invention relates to a supportive walker for disable or old persons, and more particularly, to an improved structure of supportive walker that can easily be switched between the extended position and the folded position and then positively locked in the desired position.

2. Description of Related Art

A conventional supportive walker 90 is illustrated in FIG. 1 and generally includes a front frame 91 and a rear frame 92 which is pivotally connected to the front frame 91 by two safety buckles 94. Each of the front frame 91 and the rear frame 92 has a wheel 95 connected to a lower end thereof. A limitation plate 93, such as a link 931 in this case, is connected between the front frame 91 and the rear frame 92 so that the rear frame 92 can be expanded away from the front frame 91 or can be folded close to the front frame 91. In an expansion status of the supportive walker 90, a safety buckle 94 is connected between the front frame 91 and the rear frame 92 so as to ensure the fixed position of the front frame 91 and the rear frame 92. The safety buckle 94 includes a slot 941 defined in the rear frame 92 and a connection plate 942. The connection plate 942 has one end thereof connected to the link 931 and the other end of the connection plate 942 is engaged with the slot 941 so as to prevent the rear frame 92 from collapsing. Nevertheless, when the supportive walker 90 is moved on a rugged road, the connection plate 942 tends to disengage from the slot 941 and this could result in an accident. Furthermore, the location of the connection plate 942 is not convenient for the user to operate, especially for the users who are disable persons.

The present invention intends to provide a safety means of a supportive walker wherein the operation for the safety means is easy and convenient for the disable persons.

Therefore, it is desirable to provide an improved speech recognition method to mitigate and/or obviate the aforementioned problems.

SUMMARY OF THE INVENTION

It is the main object of the present invention to provide a supportive walker, which has a simple structure. It is another object of the present invention to provide a supportive walker, which is safe in use. It is still another object of the present invention to provide a supportive walker, which can conveniently be set between the extended position and the folded position.

To achieve these and other objects of the present invention, the supportive walker comprises a front frame, a rear frame, a pair of limitation plates, and at least one safety means. Each of the front frame and the rear frame has a wheel connected to a respective lower end thereof. The limitation plates are adapted to support relative movements of the front frame and the rear frame between an extended position and a folded position. And the safety means is adapted to selectively lock the front frame and the rear frame between the extended position and the folded position. The present invention is characterized that the limitation plates are respectively connected to the front frame and each limitation plate having a passage defined therethrough. While each safety means comprises a mounting unit and a control unit. The mounting unit is fixedly mounted on the limitation plate, and has two outwardly extended side wings each including a sliding slot. Further, the mounting unit defines an opening in a middle part thereof. The control unit, which is set between the side wings of the mounting unit, comprises a set of sliding channels on a middle part thereof corresponding to the sliding slot at each side wing and an inner protruding block corresponding to the opening of the mounting unit. The control unit further includes an actuating device having a hole corresponding to the sliding slots of the side wings and the sliding channels of the control unit. Such that a pivot pin is adapted to pivotally connect the hole of the actuating device to the sliding slots of the side wings and the sliding channels of the control unit for enabling the actuating device to be operated to move the pivot pin along the sliding slots and the sliding channels and to further move the inner protruding block through the opening into the passage to lock the rear frame to the front frame between the extended position and the folded position, or to move the inner protruding block out of the passage to unlock the rear frame from the front frame for enabling the rear frame and the front frame to be moved relative each other between the extended position and the folded position.

DETAILED DESCRIPTION OF THE PREFERRED EMBODIMENT

Figure 1:
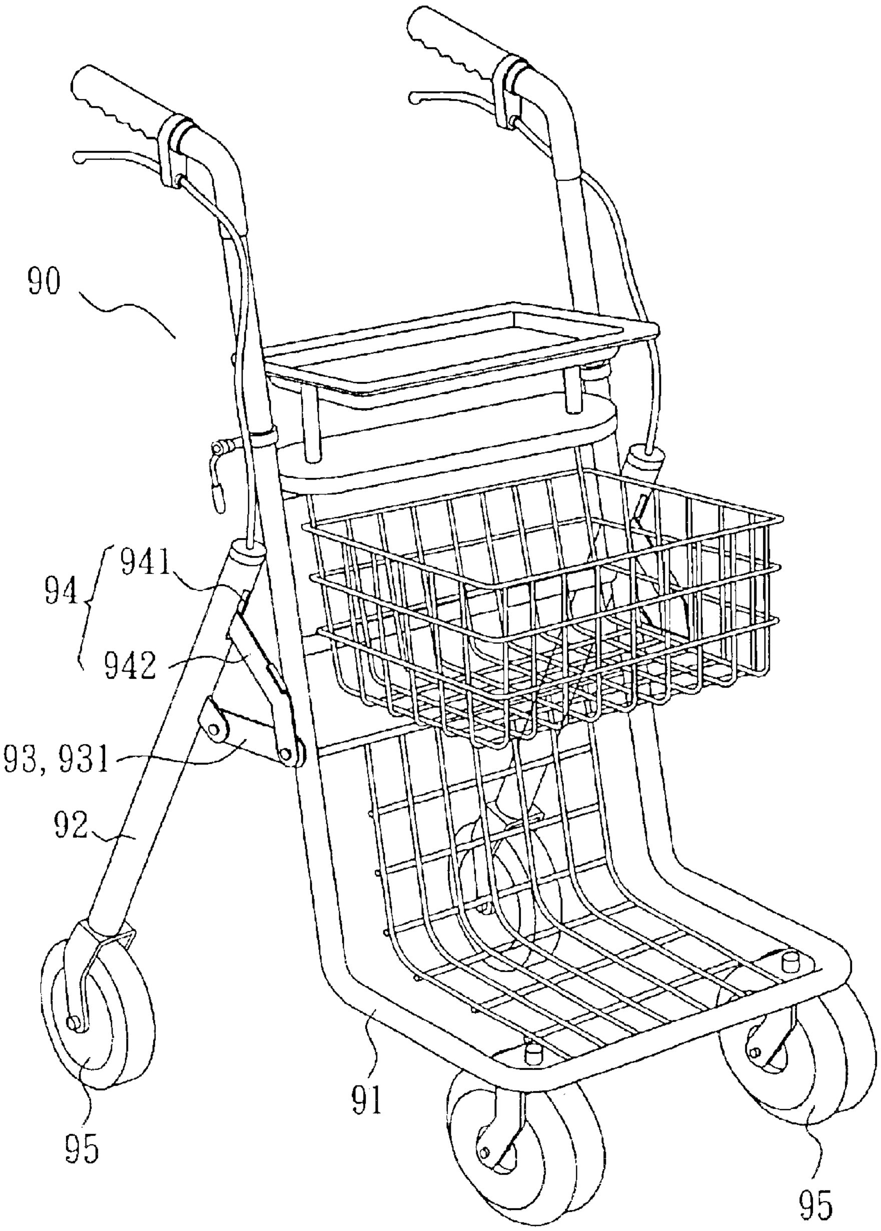
FIG. 1 (PRIOR ART)
FIG. 1 is a perspective view of a supportive walker according to the prior art.
Figure 2:
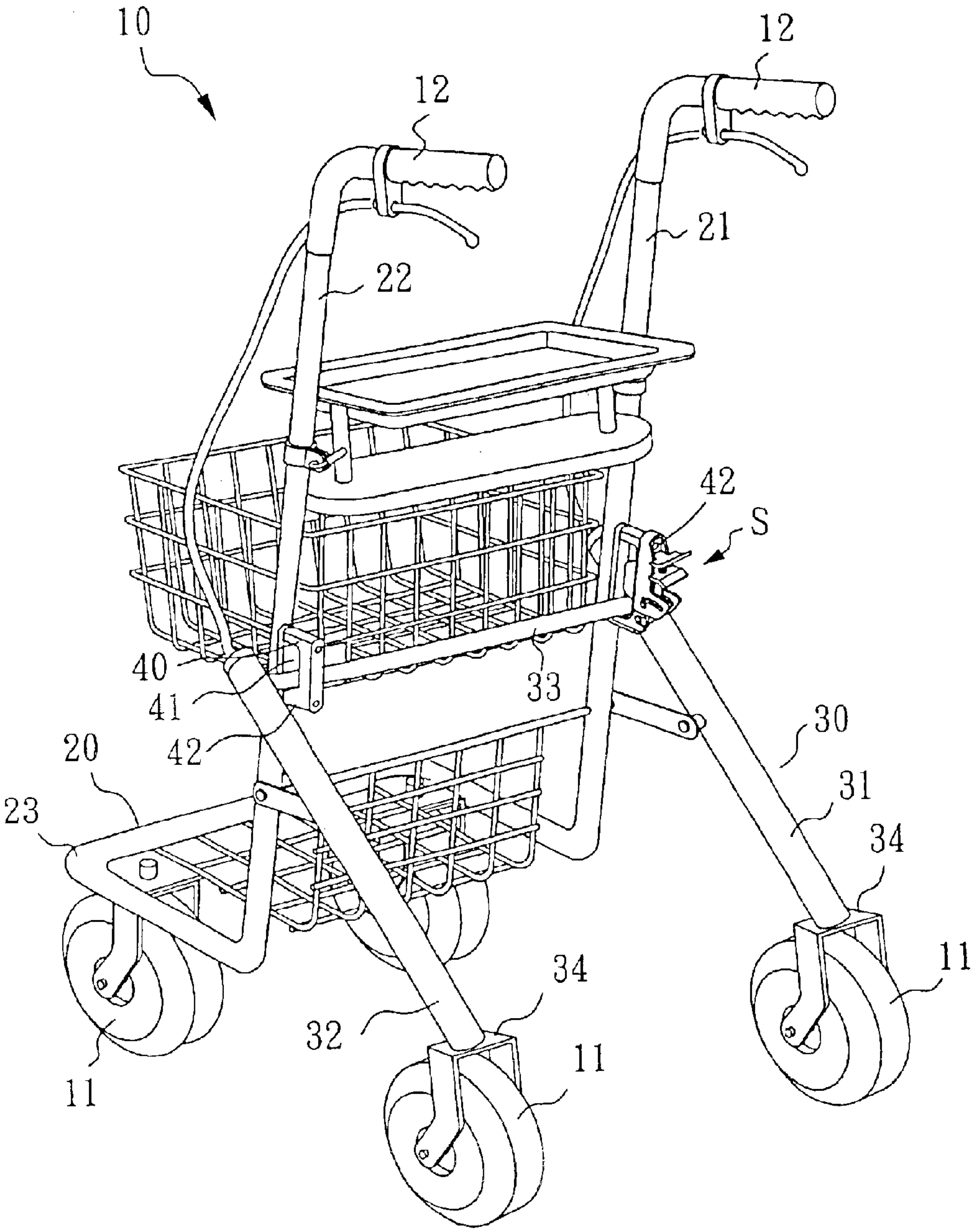
FIG. 2 is a perspective view of the preferred embodiment of the present invention, showing the supportive walker locked in the extended position.

Referring to FIG. 2, the supportive walker 10 in accordance with the present invention is shown comprising a front frame 20, a rear frame 30, two limitation plates 40, and a safety lock S. As illustrated in FIG. 2, the bottom side 23 of the front frame 20 and the bottom side 34 of the rear frame 30 are respectively equipped with at least one wheel 11. According to this embodiment, the supportive walker 10 is equipped with four wheels 11. Alternatively, the supportive walker can be made having only three wheels (one at the front frame and two at the rear frame). Left and right brake devices 12 are respectively provided at first front vertical bar 21 and second front vertical bar 22 of the front frame 20 at the top. The rear frame 30 is comprised of a first rear vertical bar 31, a second rear vertical bar 32, and a connection bar 33. The connection bar 33 is connected between the top end of the first rear vertical bar 31 and the top end of the second rear vertical bar 32, enabling the first rear vertical bar 31 and the second rear vertical bar 32 to be moved synchronously.

Figure 3:
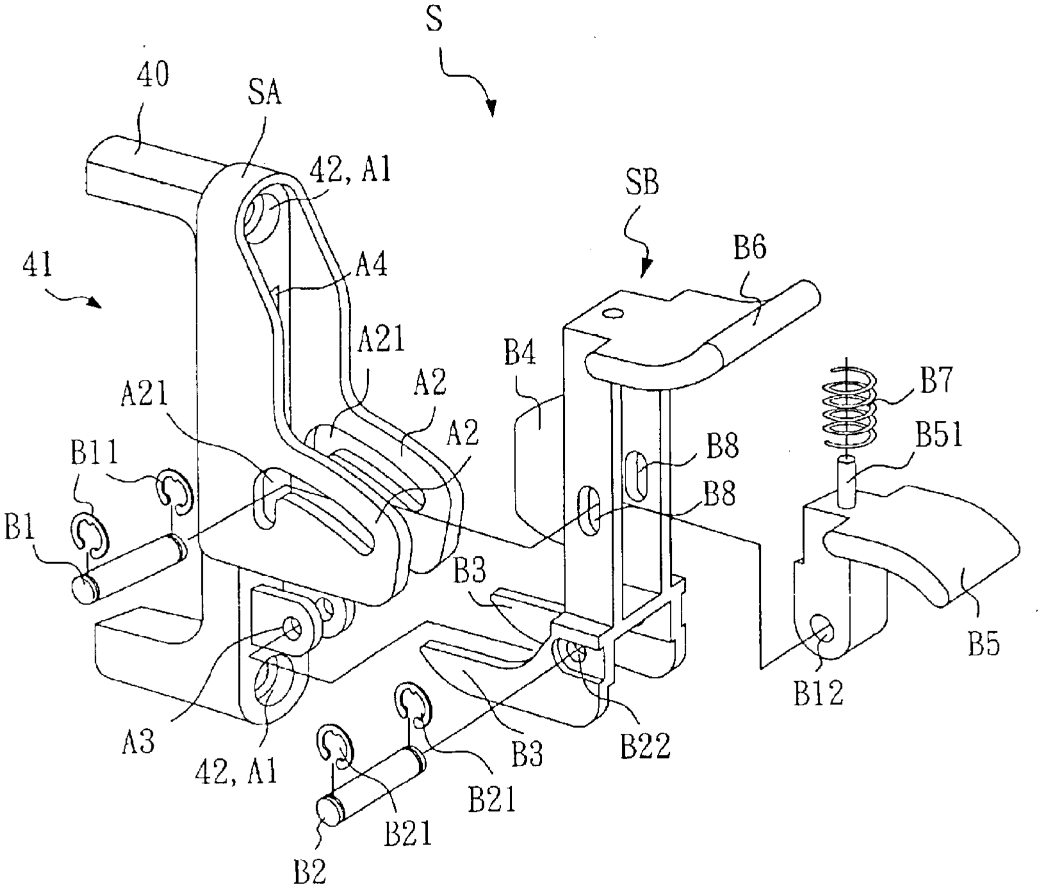
FIG. 3 is an exploded view of the safety lock for the supportive walker according to the present invention.

Referring to FIG. 3 and FIG. 2 again, in order to let the user use, store, or carry the supportive walker 10 conveniently, the limitation plates 40 and the safety lock S are provided to control folding and extending operation between the front frame 20 and the rear frame 30.

According to this embodiment, the limitation plates 40 are respectively disposed at the first front vertical bar 21 and second front vertical bar 22 of the front frame 20, and respectively fixedly fastened to the front vertical bar 21 and the second front vertical bar 22 by fastening members 42. Alternatively, the limitation plates 40 can be respectively formed integral with the front vertical bar 21 and the second front vertical bar 22. Each limitation plate 40 has a passage 41 defined therethrough adapted to accommodate the connection bar 33, enabling the connection bar 33 to be moved within the passage 41.

The safety lock S is comprised of a mounting unit SA and a control unit SB. According to this embodiment, the mounting unit SA is fixedly mounted on the limitation plate 40 at the first front vertical bar 21 (alternatively, two safety locks may be used and respectively installed in the limitation plates at the first and second front vertical bars of the front frame).

The aforesaid fastening members 42 are respectively mounted in respective screw holes A1 at the mounting unit SA to fixedly secure the mounting unit SA to the corresponding limitation plate 40. The control unit SB is provided between two outwardly extended side wings A2 of the mounting unit SA, and adapted to control folding and extending operations of the supportive walker 10 by means of the functioning of a spring force set formed of a compression member B5, a supporting member B6, and a spring member B7.

Figure 4:
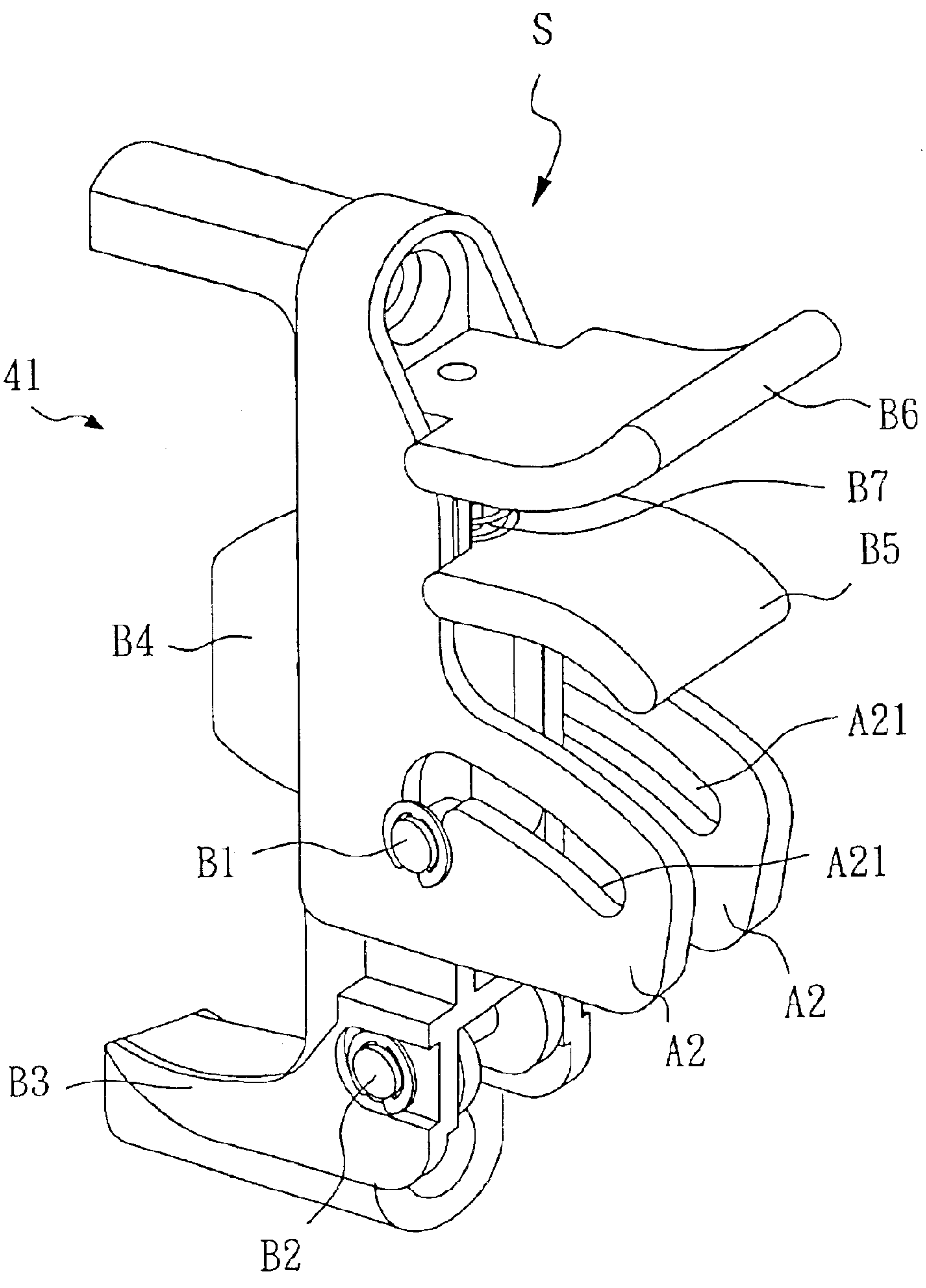
FIG. 4 is an assembly view of FIG. 3.

The detailed structure and operation method of the safety lock S are described hereinafter with reference to FIG. 4 and FIG. 3 again. The second pivot pin, referenced by B2, is mounted in axle holes A3 and B22 to pivotally connect the control unit SB to the mounting unit SA. C-shaped retainers B21 are respectively clamped on two distal ends of the second pivot pin B2 to secure the second pivot pin B2 to the mounting unit SA, for enabling the control unit SB to be turned about the second pivot pin B2 relative to the mounting unit SA. The two outwardly extended side wings A2 of the mounting unit SA each have a L-shaped sliding slot A21. The control unit SB has a set of oblong sliding channels B8 disposed on the middle corresponding to the L-shaped sliding slots A21 at the outwardly extended side wings A2 of the mounting unit SA. The aforesaid spring force set has a hole B12 disposed at the bottom side corresponding to the L-shaped sliding slots A21 at the outwardly extended side wings A2 and the oblong sliding channels B8 at the control unit SB. A first pivot pin B1 is mounted in the hole B12, the L-shaped sliding slots A21, and the oblong sliding channels B8 and secured in place by C-shaped retainers B11. According to this embodiment, the L-shaped sliding slots A21 each have a part (hereinafter called the locating slot section) disposed in parallel to the passage 41 of the corresponding limitation plate 40 for positioning. The other part (hereinafter called the sliding slot section) of each L-shaped sliding slot A21 is smoothly curved for sliding. When set the first pivot pin B1 in the locating slot section of each L-shaped sliding slot A21, as shown in FIG. 4, the control unit SB is locked to the mounting unit SA. At this time, the inner protruding block B4 of the control unit SB is inserted through an opening A4 in a middle part of the mounting unit SB and into the passage 41 of the corresponding limitation plate 40 to hold down the connection bar 33, and therefore the supportive walker 10 is locked in the extended (or folded) position. On the contrary, when set the first pivot pin B1 in the sliding slot section of each L-shaped sliding slot A21, as shown in FIG. 5, the spring force set is turned about the second pivot pin B2 to move the first pivot pin B1 outwards along the sliding slot section of each L-shaped sliding slot A21, thereby causing the inner protruding block B4 of the control unit SB to be disengaged from the passage 41 of the corresponding limitation plate 40 to release the connection bar 33, for enabling the front frame 20 and the rear frame 30 to be moved relative to each other between the extended position and the folded position.

Figure 5:
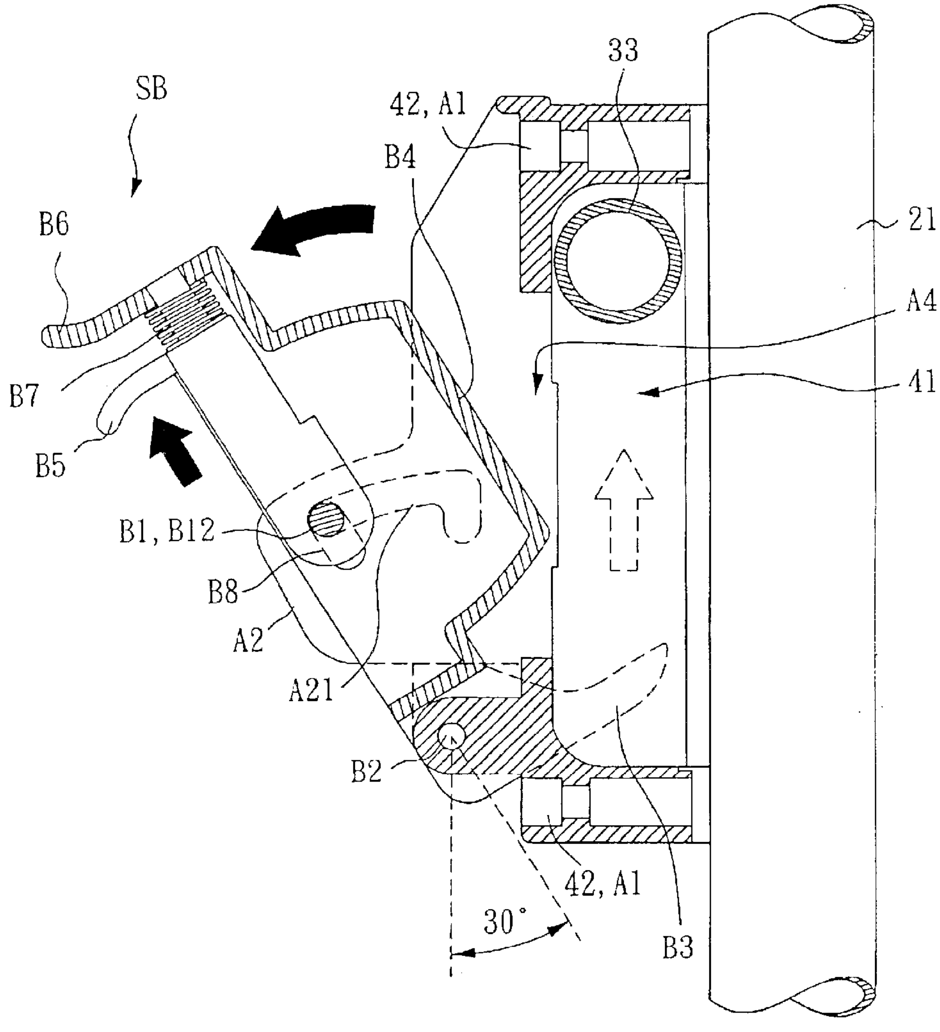
FIG. 5 is a schematic drawing showing the operation of the safety lock according to the present invention (I)
Figure 6:
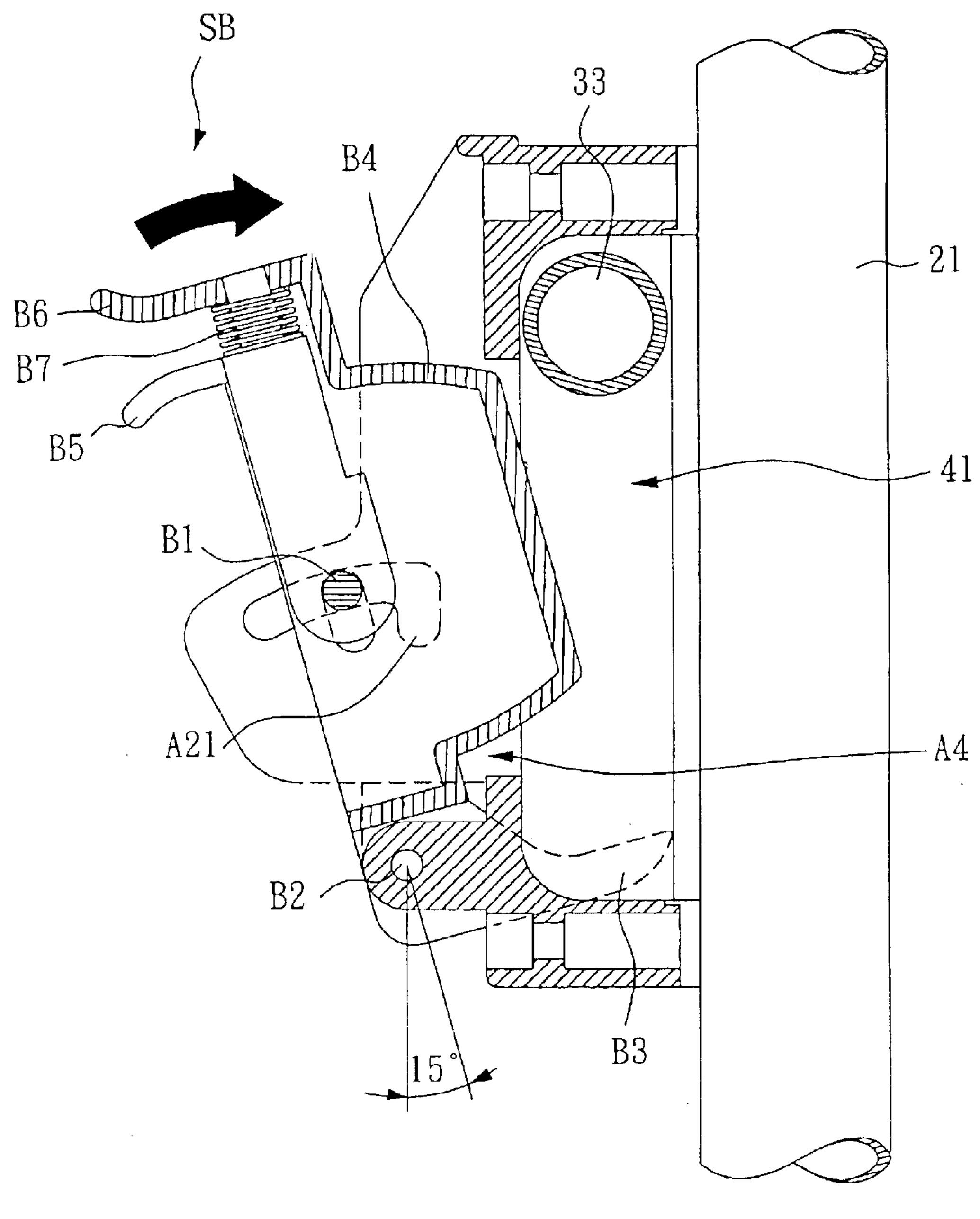
FIG. 6 is a schematic drawing showing the operation of the safety lock according to the present invention (II)
Figure 7:
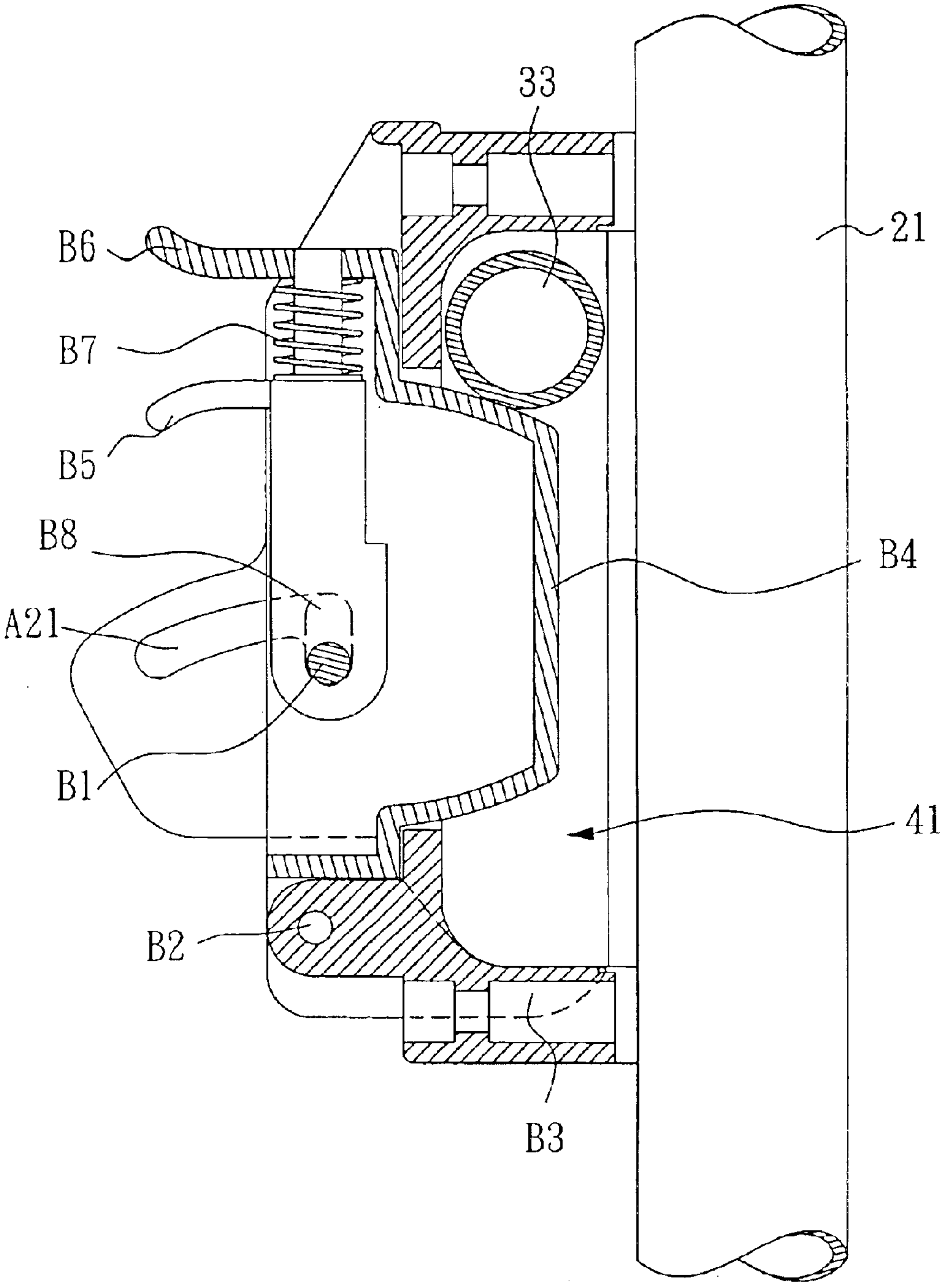
FIG. 7 is a schematic drawing showing the operation of the safety lock according to the present invention (III)
Figure 8:
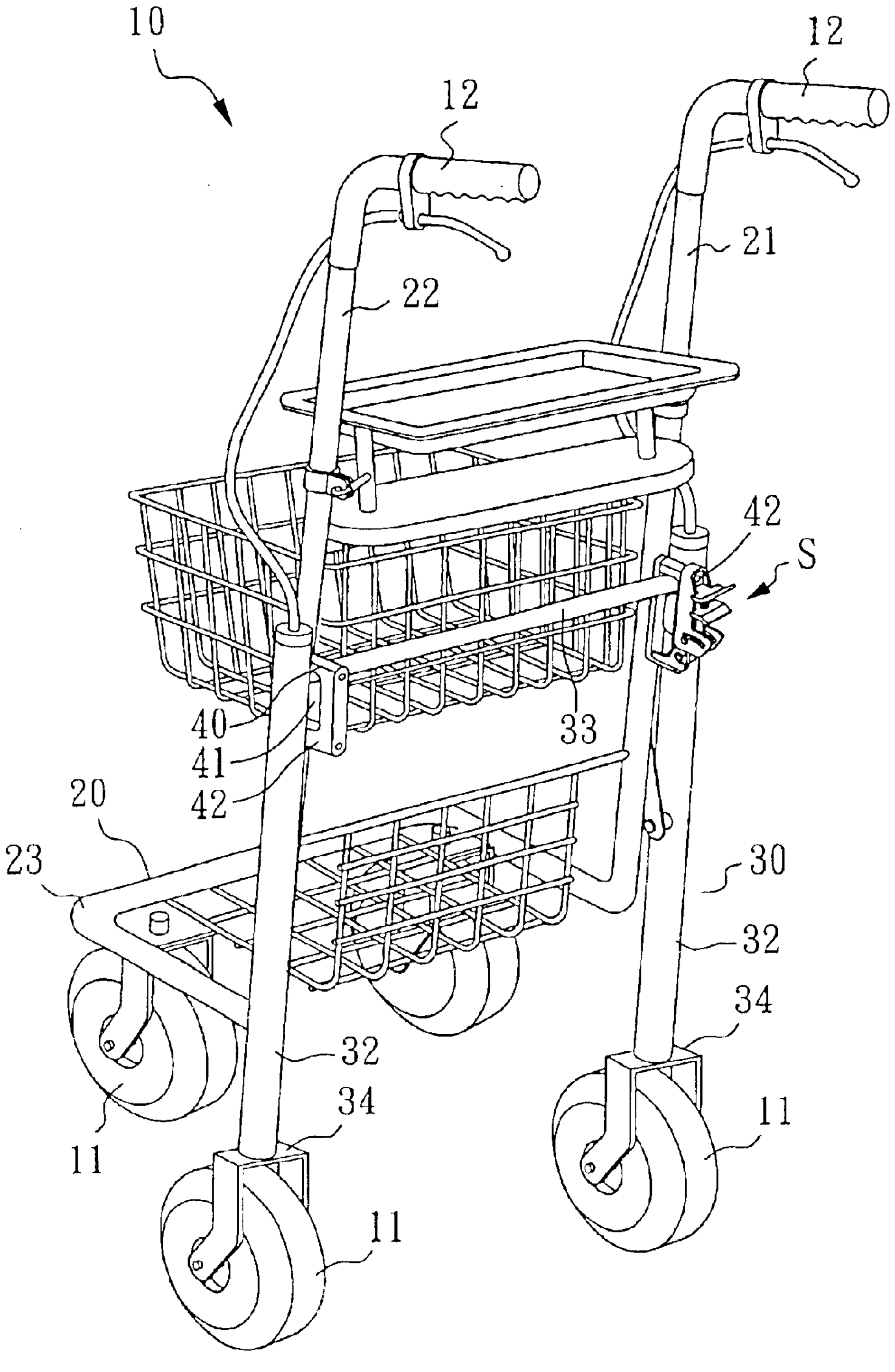
FIG. 8 is another perspective view of the preferred embodiment of the present invention, showing the supportive walker locked in the folded position.

FIGS. 5~7 are schematic drawings showing continuous actions to set the supportive walker 10 from the extended position shown in FIG. 2, where the connection bar 33 is received in between the inner protruding block B4 and bottom projections B3 of the control unit SB at the bottom side inside the passage 41, to the folded position shown in FIG. 8, where the connection bar 33 is received in the passage 41 above the inner protruding block B4. The user can press the compression member B5 of the spring force set to compress the spring member B7 along a pin B51 against the supporting member B6 and to simultaneously move hole B12 and the first pivot pin B1 toward the supporting member B6, and therefore the first pivot pin B1 is disengaged from the locating slot section of each L-shaped sliding slot A21. Thereafter, the user turn the control unit SB about the second pivot pin B2 to move the first pivot pin B1 outwards along the smoothly curved sliding slot section of each L-shaped sliding slot A21 to unlock the supportive walker 10, for enabling the connection bar 33 to be adjusted to the desired elevation (FIG. 5 shows the connection bar 33 pulled outwards through 30° angle). Because the control unit SB has bottom projections B3, pulling the control unit SB outwards from the mounting unit SA causes the bottom projections B3 to move upwards along the passage 41. Therefore, the user can easily push the connection bar 33 upwards to fold the supportive walker 10 with less effort.

Referring to FIG. 6, when pushed the connection bar 33 to the upper side in the passage 41, the control unit SB is received to the mounting unit SA, and therefore the supportive walker 10 is collapsed. When the control unit SB moved to the angle about 15° relative to the vertical axis, the first pivot pin B1 is disposed in the sliding slot section of each L-shaped sliding slot A21, however the spring force set is still maintained at the compressed status, showing that the connection bar 33 is still not locked yet. When zeroed the contained angle between the control unit SB and the vertical axis, as shown in FIG. 7, the oblong sliding channels B8 at the control unit SB are in line with the L-shaped sliding slots A21 at the mounting unit SA, therefore the first pivot pin B1 can be moved downwards along the passage 41 and the sliding slot section of each L-shaped sliding slot A21 to release the compressed status of the spring force set, for enabling the control unit SB to be locked to the mounting unit SA. At the same time, the inner protruding block B4 of the control unit SB is inserted through the opening A4 in the middle part of the mounting unit SB into the passage 41 of the corresponding limitation plate 40 to hold down the connection bar 33. FIG. 8 shows the connection bar 33 positioned in the top side inside the passage 41, and the inner protruding block B4 prohibits the connection bar 33 from downward displacement. Therefore the supportive walker 10 is positively locked in the folded position.

When wishing to extend out the front frame 20 and the rear frame 30, press the compression member B5 and pull the control unit SB outwards to disengage the inner protruding block B4 from the passage 41 temporarily. At this time, the connection bar 33 fall to the bottom side in the passage 41 to press the bottom projections B3 to due to the effect of its gravity weight, and therefore the control unit SB is forced by the lever action to move along the sliding slot section of each L-shaped sliding slot A21 to the respective locating slot section, so as to return the inner protruding block B4 to its former position and to stop the connection bar 33 in the bottom side inside the passage 41, preventing relative displacement between the front frame 20 and the rear frame 30.

While only one embodiment of the present invention has been shown and described, it will be understood that various modifications and changes could be made thereunto without departing from the spirit and scope of the invention disclosed.

Although the present invention has been explained in relation to its preferred embodiment, it is to be understood that many other possible modifications and variations can be made without departing from the spirit and scope of the invention as hereinafter claimed.

What is claimed is:

1. A supportive walker at least comprising a front frame, a rear frame, a pair of limitation plates, and at least one safety means, each of the front frame and the rear frame having a wheel connected to a respective lower end thereof, the limitation plates adapted to support relative movement of the front frame and the rear frame between an extended position and a folded position, the safety means adapted to selectively lock the front frame and the rear frame between the extended position and the folded position, wherein:

the limitation plates are respectively connected to the front frame and each limitation plate having a passage defined therethrough, a connection bar connected between one end of the rear frame and movably extending through the two passages of the two limitation plates between the extended position and the folded position; each safety means comprising a mounting unit and a control unit, the mounting unit being fixedly mounted on the limitation plate and having two outwardly extended side wings each including a sliding slot, the mounting unit further defining an opening in a middle part of the mounting unit, the control unit being set between the side wings of the mounting unit, the control unit comprising a set of sliding channels on a middle part thereof corresponding to the sliding slot at each side wing, an inner protruding block corresponding to the opening of the mounting unit, and an actuating device having a hole corresponding to the sliding slots of the side wings and the sliding channels of the control unit such that a pivot pin adapted to pivotally connect the hole of the actuating device to the sliding slots of the side wings and the sliding charnels of the control unit for enabling the actuating device to be operated to move the pivot pin along the sliding slots and the sliding channels and to further move the inner protruding block through the opening into the passage to lock the rear frame to the front frame between the extended position and the folded position, or to move the inner protruding block out of the passage to unlock the rear frame from the front frame for enabling the rear frame and the front frame to be moved relative each other between the extended position and the folded position.

2. The supportive walker as claimed in claim 1, wherein the sliding slot of each side wing is a substantially L-shaped sliding slot having a locating slot section and a sliding slot section; the sliding channels of the control unit correspond to the locating slot sections such that when the rear frame locked to the front frame, the pivot pin is set in the locating slot sections; otherwise when the rear frame and the front frame are unlocked for relative movement, the pivot pin is movably disposed in the sliding slot sections.

3. The supportive walker as claimed in claim 2, wherein the locating slot sections are disposed in parallel to the passages of the limitation plates.

4. The supportive walker as claimed in claim 2, wherein the actuating device of the control unit comprises a compressible spring force set adapted to move the pivot pin along the locating slot sections and the sliding channels toward the sliding slot sections of the sliding slots when compressed, for enabling the pivot pin to be further moved outwards along the sliding slot sections of the sliding slots to unlock the rear frame from the front frame.

5. The supportive walker as claimed in claim 1, wherein the control unit comprises an inwardly extended bottom projection; the part of the rear frame which is received in the passages of the limitation plates is disposed in between the inner protruding block and the bottom projection when the front frame and the rear frame moved to the extended position.

6. The supportive walker as claimed in claim 5, wherein when moving the control unit along the sliding slots to fold the front frame and the rear frame, the projection is forced to move the rear frame upwards;

otherwise when moving the control unit along the sliding slots to extend out the front frame and the rear frame, the rear frame forces the bottom projection downwards, causing the control unit to move along the sliding slot sections of the sliding slots of the outwardly extended side wings to the locating slot sections of the sliding slots of the outwardly extended side wings according to the leverage principle.

* * * * *